(12) United States Patent
Lee et al.

(10) Patent No.: US 10,496,805 B2
(45) Date of Patent: Dec. 3, 2019

(54) OPERATING METHOD FOR HANDHELD DEVICE

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 132 days.

(21) Appl. No.: 15/467,180

(22) Filed: Mar. 23, 2017

(65) Prior Publication Data

US 2017/0277874 A1 Sep. 28, 2017

(30) Foreign Application Priority Data

Mar. 25, 2016 (TW) .............................. 105109364 A

(51) Int. Cl.
*G06F 21/32* (2013.01)
*G06F 3/041* (2006.01)
*G06F 21/84* (2013.01)
*G06K 9/00* (2006.01)

(52) U.S. Cl.
CPC .............. *G06F 21/32* (2013.01); *G06F 3/041* (2013.01); *G06F 21/84* (2013.01); *G06K 9/00013* (2013.01); *G06K 9/00087* (2013.01)

(58) Field of Classification Search
CPC .......... G06F 21/32; G06F 3/041; G06F 21/84; G06K 9/00013; G06K 9/00087
USPC ..................................................... 726/26–28
See application file for complete search history.

(56) References Cited

U.S. PATENT DOCUMENTS

| | | | | |
|---|---|---|---|---|
| 9,549,323 | B2* | 1/2017 | Lee ........................ | G06F 21/35 |
| 2005/0226468 | A1* | 10/2005 | Deshpande ............. | H04M 1/66 |
| | | | | 382/115 |
| 2010/0134424 | A1* | 6/2010 | Brisebois et al. .... | G06F 3/0484 |
| | | | | 715/765 |
| 2014/0317722 | A1* | 10/2014 | Tartz et al. ........... | G06F 3/0414 |
| | | | | 345/173 |

(Continued)

FOREIGN PATENT DOCUMENTS

| | | |
|---|---|---|
| CN | 103237115 A | 8/2013 |
| CN | 103348352 A | 10/2013 |

(Continued)

OTHER PUBLICATIONS

Office Action dated Sep. 12, 2016 of the corresponding Taiwan patent application.

(Continued)

*Primary Examiner* — Trang T Doan
(74) *Attorney, Agent, or Firm* — Chun-Ming Shih; HDLS IPR Services

(57) ABSTRACT

An operating method for handheld device is provided. The method includes following steps: detecting whether a user is holding a handheld device; control the handheld device to execute a privacy non-preserving procedure when detecting that the user is holding the handheld device; detecting whether the user stops holding the handheld device; control the handheld device to execute a privacy-preserving procedure when detecting that the user stops holding the handheld device.

11 Claims, 6 Drawing Sheets

(56) References Cited

U.S. PATENT DOCUMENTS

| | | | |
|---|---|---|---|
| 2014/0375582 A1* | 12/2014 | Park | G06F 3/0414 345/173 |
| 2015/0205358 A1* | 7/2015 | Lyren | G06F 3/0484 715/765 |
| 2015/0242605 A1* | 8/2015 | Du | G06F 21/32 726/7 |
| 2015/0319294 A1* | 11/2015 | Sudhir | H04M 1/72541 455/411 |
| 2015/0324564 A1* | 11/2015 | Sahu | G06F 21/45 726/19 |
| 2016/0014260 A1* | 1/2016 | Cudak | H04M 1/67 455/411 |
| 2016/0014261 A1* | 1/2016 | Cudak | H04M 1/67 455/411 |
| 2016/0076952 A1* | 3/2016 | Kim | H03K 17/962 345/173 |
| 2016/0275281 A1* | 9/2016 | Ranjit | G06F 21/32 |
| 2016/0364624 A1* | 12/2016 | Kim et al. | G06K 9/4647 |
| 2017/0017783 A1* | 1/2017 | Willis | G06F 21/32 |
| 2017/0024597 A1* | 1/2017 | Cho | G06F 21/32 |
| 2017/0115782 A1* | 4/2017 | Hinckley | G06F 3/0346 |

FOREIGN PATENT DOCUMENTS

| | | |
|---|---|---|
| CN | 203691467 U | 7/2014 |
| TW | 201004295 A | 1/2010 |
| TW | 201312386 A | 3/2013 |

OTHER PUBLICATIONS

Office Action dated Aug. 13, 2019 of the corresponding China patent application.

* cited by examiner

OPERATING METHOD FOR HANDHELD DEVICE

BACKGROUND OF THE INVENTION

Field of the Invention

The present invention relates to an operating method, especially to an operating method of handheld device.

Description of Prior Art

In the operation of current handheld device, user needs to manually turn on display screen of handheld device and then manually unlock screen lock when user intends to operate the handheld device. After the display screen is unlocked, user needs to manually activate specific application program (such as webpage browser program or email program).

Moreover, user needs to manually lock display screen and turn off the display screen when user no longer needs to operate the handheld device (for example, user wants to put down the handheld device, thus preventing the handheld device and associated privacy from peeping out by others.

As can be seen from above description, user needs to perform various operations when he wants to use or no longer wants to use the handheld device such that the privacy information of the handheld device can be prevented from peeping out. It is not convenient for user and user cannot get good user experience.

SUMMARY OF THE INVENTION

It is an object of the present invention to provide an operating method of handheld device to automatically perform specific procedure when user holds or puts down the handheld device.

Accordingly, the present invention provides an operating method for a handheld device, comprising: a) detecting whether a user currently holds the handheld device by using at least one biometric sensor arranged on grip portion of the handheld device; b) generating a triggering signal corresponding to each holding action of the user and generating a user grip data corresponding to the triggering signal; c) performing a biometric verification for the user grip data, controlling the handheld device to execute a privacy non-preserving procedure when the user grip data passes the biometric verification, wherein the privacy non-preserving procedure includes turning on display screen, unlocking screen lock, executing or proceeding to execute a first predetermined procedure, stopping executing or temporarily stopping executing a second predetermined procedure; d) continually or intermittently detecting whether the user stops holding the handheld device by the at least one biometric sensor; e) determining the user stops holding the handheld device when the triggering signal is not received and controlling the handheld device to execute a privacy-preserving procedure, wherein the privacy-preserving procedure includes turning off display screen, locking screen lock, stopping executing or temporarily stopping executing the first predetermined procedure, executing or proceeding to execute the second predetermined procedure.

Accordingly, the present invention provides an operating method for a handheld device, comprising: a) detecting whether a user currently holds the handheld device by using at least one touch sensor arranged on grip portion of the handheld device; b) generating a triggering signal corresponding to each holding action of the user and generating a user grip data corresponding to the triggering signal; c) controlling the handheld device to execute a privacy non-preserving procedure when receiving the triggering signal, wherein the privacy non-preserving procedure includes turning on display screen, unlocking screen lock, executing or proceeding to execute a first predetermined procedure, stopping executing or temporarily stopping executing a second predetermined procedure; d) continually or intermittently detecting whether the user stops holding the handheld device by using the at least one touch sensor; and e) determining the user stops holding the handheld device when the triggering signal is not received and controlling the handheld device to execute a privacy-preserving procedure, wherein the privacy-preserving procedure includes turning off display screen, locking screen lock, stopping executing or temporarily stopping executing the first predetermined procedure, executing or proceeding to execute the second predetermined procedure.

The present invention automatically performs privacy non-preserving procedure or privacy preserving procedure by detecting the user-hodling status of the handheld device. The privacy can be protected and the operation of the handheld device can be simplified.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1:
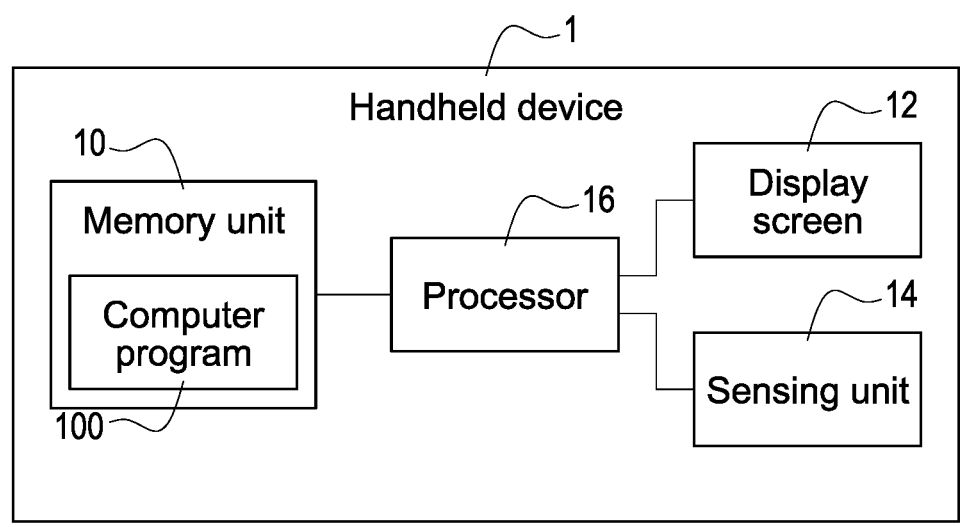
FIG. 1 is a schematic diagram of the handheld device according to an embodiment of the present invention.

FIG. 1 is a schematic diagram of the handheld device according to an embodiment of the present invention. The present invention discloses an operating method used for handheld device and applicable to the handheld device 1 shown in FIG. 1. The handheld device 1 (such as smart phone, panel computer, wearable device, or digital camera) according to the present invention mainly comprises a memory unit 10 for storing computer-readable data or program, a display screen 12 (such as a touch display), at least one sensing unit 14 and a processor 16 electrically connected to above mentioned units. The memory unit 10 is used to store data while the processor 16 is used to provide control function for the handheld device 1.

Figure 5:
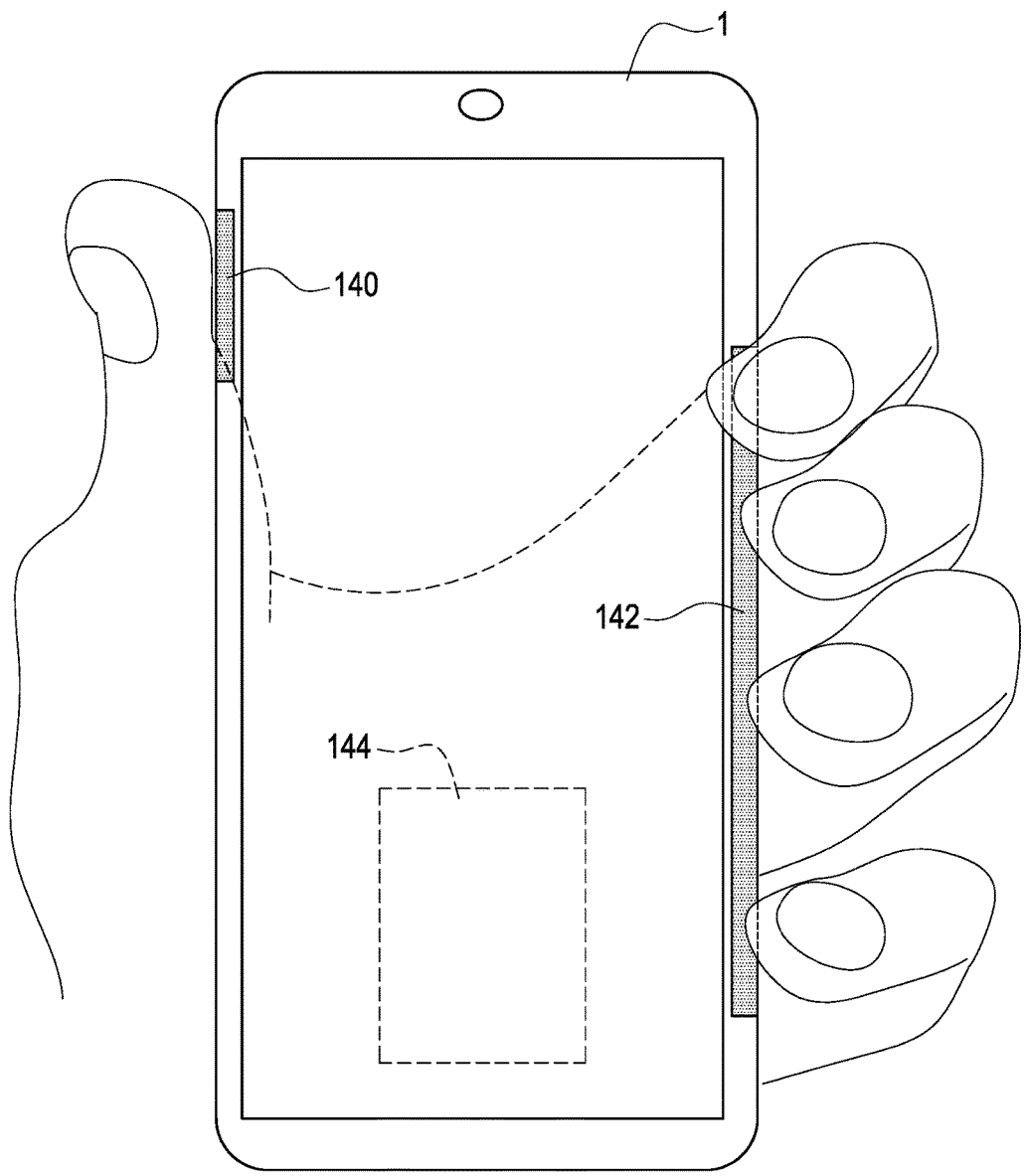
FIG. 5 shows a first operation of the handheld device 1 according to an embodiment of the present invention.
Figure 6:
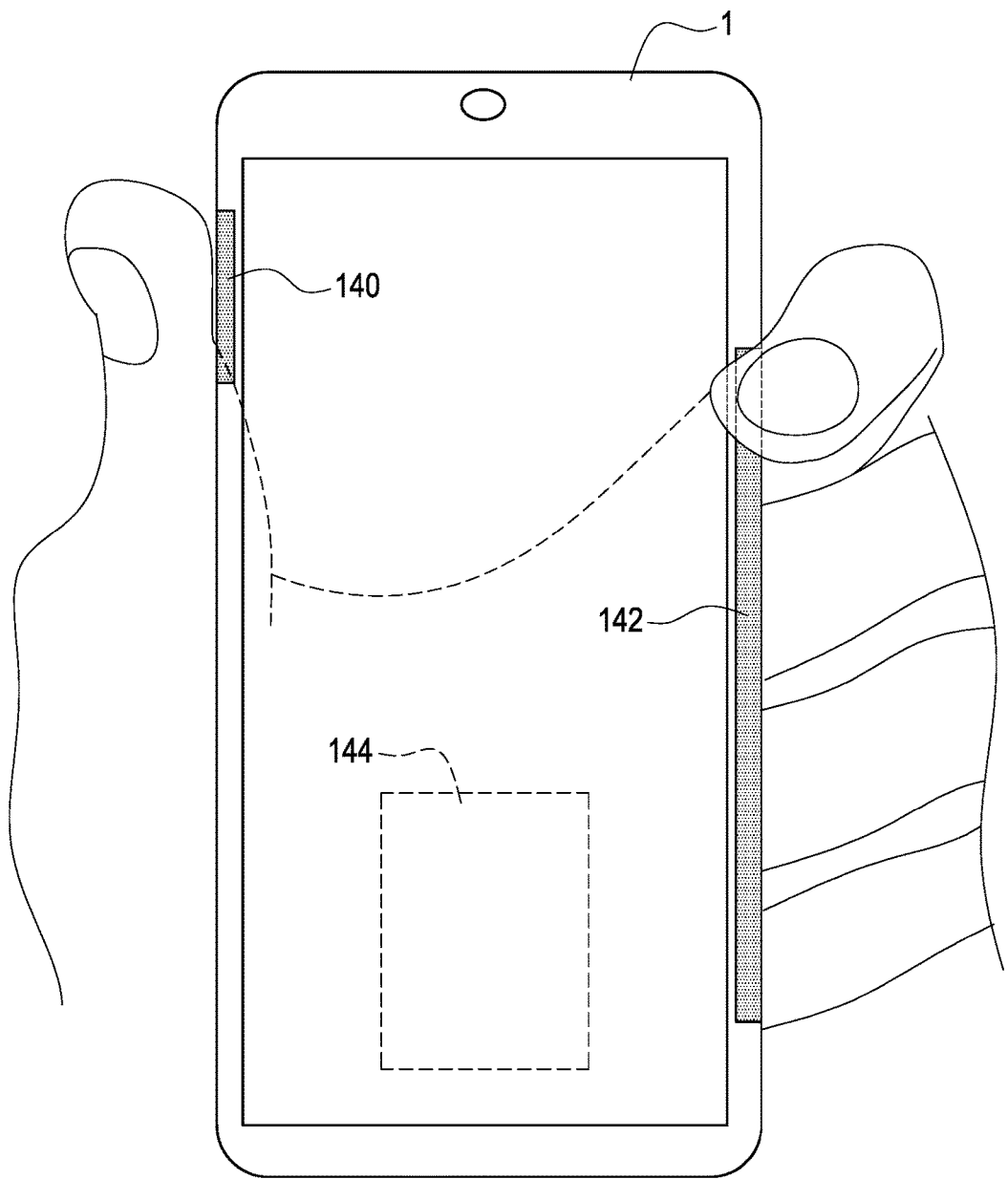
FIG. 6 shows a second operation of the handheld device 1 according to an embodiment of the present invention.

The sensing unit 14 is arranged on a grip portion of the handheld device 1, which is naturally held by user in the operation of the handheld device 1 and is, for example, the positions corresponding to the location of the fingerprint sensors 140-144 shown in FIGS. 5 and 6. Preferably, the sensing unit 14 is, for example but not limited to, a biometric recognition unit (such as a fingerprint sensor) or a touch sensor (such as a force sensor).

The sensing unit 14 is inevitably touched by the user when the user holds the handheld device 1 and the sensing unit 14 will generate a triggering signal correspondingly. The present invention determines whether the user currently holds the handheld device 1 according to the triggering of the sensing unit 14 and performs a corresponding procedure (detailed later) according to the determination result of user holding the handheld device 1 or not.

In the above embodiment, the sensing unit 14 is exemplified to be arranged directly on (built-in) the handheld device 1, but this is not limitation to the present invention.

In another embodiment, the sensing unit 14 is arranged on a detachable back shell (not shown) of the handheld device 1. The sensing unit 14 is further electrically connected to the processor 16 when the back shell is assembled to the handheld device 1. Preferably the back shell has a connector corresponding to the connection port of the handheld device 1. The connector of the back shell is detachably connected to a connection port of the handheld device 1 when the back shell is assembled to the handheld device 1 such that the sensing unit 14 is electrically connected to the processor 16. In still another embodiment, the sensing unit 14 may be wirelessly connected to the processor 16 to dispense with the connection port of the handheld device 1.

Figure 2:
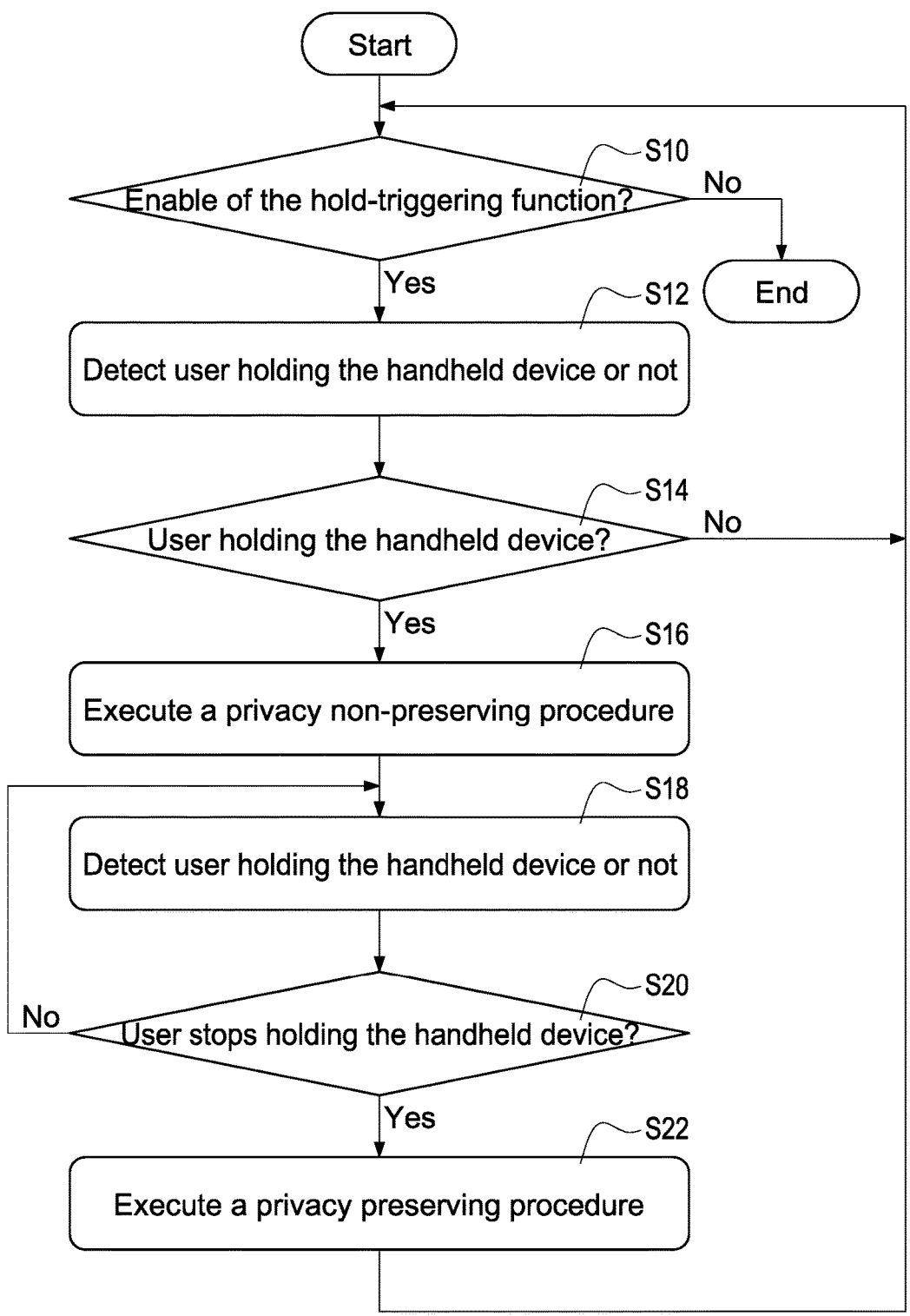
FIG. 2 shows a flowchart of the operating method for the handheld device 1 according to an embodiment of the present invention.

FIG. 2 shows a flowchart of the operating method for the handheld device 1 according to an embodiment of the present invention. The operating methods according to various embodiments of the present invention may be performed on the handheld device 1 shown in FIG. 1. More specifically, the memory unit 10 further stores a computer program 100 having computer-executable codes. The processor 16 executes the computer-executable codes to realize the operating method for the handheld device 1. The operating method for the handheld device 1 according to the present invention has following steps to realize hold-triggering function.

S10: the processor 16 determines whether the hold-triggering function is enabled? More specifically, user can enable or disable the hold-triggering function by operating touch display or physical key(s) of the handheld device 1.

Therefore, user has more satisfactory user experience by flexibly enabling/disabling hold-triggering function according his need. For example, user may disable the hold-triggering function of the present invention when the handheld device 1 is placed on a table during operation thereof (for example playing back video program), namely not during holding operation. In this way, the handheld device 1 can be prevented from automatically switching to privacy preserving status.

The step S12 is executed if the processor 16 confirms the enabling of the hold-triggering function, or the operating method for the handheld device 1 is ended.

S12: the processor 16 detects user holding the handheld device 1 or not. More specifically, the processor detects continually or intermittently whether the sensing unit 14 sends the triggering signal thereto when the handheld device 1 is in privacy preserving status.

Preferably, the privacy preserving status of the handheld device 1 includes situations such as powering off the handheld device 1 (or idle state/hibernation state of the handheld device 1), shutting down display (such as turning off backlight of the display), locking the screen and other situations not displaying privacy information. Therefore, the confidential or privacy information of the handheld device 1 can be prevented from peeping.

Preferably, the sensing unit 14 is biometric sensor or touch sensor and following description is exemplified with the sensing unit 14 as biometric sensor (such as fingerprint sensor). When user holds the handheld device 1 and his fingers (or palm) touch the sensing unit 14, the sensing unit 14 is triggered to generate corresponding triggering signal (which is corresponding to the fingerprint of the finger or palm-print of the pam touching the sensing unit 14), and the sensing unit 14 sends the triggering signal to the processor 16.

The following description is exemplified with the sensing unit 14 as touch sensor (such as force sensor). When user holds the handheld device 1 and his fingers (or palm) touch the sensing unit 14, the sensing unit 14 is triggered to sense the number, the positions and the forces of touching points (by finger or palm). The sensing unit 14 then generates corresponding triggering signal (which is corresponding to the number, the positions and the forces of touching points exerted by finger or palm and sensed by the sensing unit 14) and the sensing unit 14 sends the triggering signal to the processor 16.

S14: the processor 16 determines whether user currently holds the handheld device 1 according to the triggering signal sent from the sensing unit 14.

It should be noted that the sensing unit 14 is arranged on grip portion of the handheld device 1, which is usually and naturally held by user. The sensing unit 14 is inevitably touched by the user when the user holds the handheld device 1. The sensing unit 14 will generate a triggering signal correspondingly and sends the triggering signal to the processor 16.

The processor 16 determines that the user currently holds the handheld device 1 (namely the user intends to operate the handheld device 1 currently) and executes step S16 to leave the privacy preserving status when the processor 16 receives the triggering signal sent from the sensing unit 14. Otherwise, the processor 16 determines that the user currently does not hold the handheld device 1 (namely the user does not intend to operate the handheld device 1 currently) and re-executes step S10 to maintain the privacy preserving status of the handheld device 1.

Preferably, the handheld device 1 comprises a plurality of sensing units 14 and the processor 16 determines that the user currently holds the handheld device 1 only if the processor 16 receives triggering signals from the sensing units 14 with a predetermined number (such as the whole of or more than half of the sensing units 14).

S16: the processor 16 executes a privacy non-preserving procedure to leave the privacy preserving status such that the handheld device 1 switches to the privacy non-preserving status.

Preferably, the privacy non-preserving status includes the situations of turning on the screen, unlocking screen or other situations probably displaying the privacy information.

It should be noted that the user can freely operate the handheld device 1 when the handheld device 1 is in privacy non-preserving status. However, the handheld device 1 probably displays the privacy information and the peeping out of privacy by others may happen.

Preferably, the privacy non-preserving procedure to leave the preserving status includes powering on procedure for the handheld device 1, (granting) remote payment procedure or screen turning on procedure. If the privacy non-preserving procedure is powering on procedure for the handheld device 1, the handheld device 1 can be turned on automatically when the handheld device 1 identifies the holding operation of user by the sensing result of the sensing unit 14. If the privacy non-preserving procedure is remote payment procedure for the handheld device 1, the handheld device 1 can grant remote payment to conduct remote transaction when the handheld device 1 identifies the holding operation of user by the sensing result of the sensing unit 14. If the privacy non-preserving procedure is screen turning on procedure for the handheld device 1, the display screen 12 of the handheld device 1 can be turned on automatically when the handheld device 1 identifies the holding operation of user by the sensing result of the sensing unit 14.

Alternatively, the privacy non-preserving procedure may turn on screen and then execute (or proceed to execute) a first predetermined procedure. More particularly, in executing the privacy non-preserving procedure, the processor 16 automatically turns on the display screen 12 and unlocks the screen lock if the screen lock exists. Afterward, the processor 16 executes (or proceeds to execute) a first predetermined procedure such as instant communication procedure, social software procedure, webpage browser procedure, or other procedures requiring display. Therefore, the user can directly execute the first predetermined procedure by only holding the handheld device 1 without needing other additional operation, thus gaining better user experience.

Alternatively, the privacy non-preserving procedure may turn on screen and then stop (or temporarily stop) from executing a second predetermined procedure.

More particularly, in executing the privacy non-preserving procedure, the processor 16 automatically turns on the display screen 12 and unlocks the screen lock if the screen lock exists. Afterward, the processor 16 stops (or temporarily stops) from executing the second predetermined procedure such as media playback procedure, communication procedure for backing-up or synchronizing data, a download procedure, an upload procedure, or other procedures not requiring display.

Therefore, the user can directly stop (or temporarily stop) from executing the second predetermined procedure by only holding the handheld device 1 without needing other additional operation, thus releasing more processing resource (such as available memory or using rate for idle processor). The processing speed of the handheld device 1 could be enhanced and the handheld device 1 can run more smoothly.

S18: the processor detects user holding the handheld device 1 or not. More particularly, the processors 16 detects, in privacy non-preserving status, continually or intermittently (for example, detects the holding for every 5 seconds) whether the processors 16 ceases to receive the triggering signal from the sensing unit 14.

Preferably, the sensing unit 14 will still generate the triggering signal and send the triggering signal to the processor 16 when the user keeps holding the handheld device 1 such that the user's finger or palm keeps touching the handheld device 1 (for example, the user picks up the handheld device 1). The sensing unit 14 stops from generating the triggering signal and from sending the triggering signal to the processor 16 when the user stop holding the handheld device 1 such that the user's finger or palm does not touch the handheld device 1 (for example, the user puts down the handheld device 1).

S20: the processor 16 determines whether the user stops holding the handheld device 1 according to the sensing unit 14 sending the triggering signal thereto or not.

Preferably, the processor 16 determines that the user stops holding the handheld device 1 if the processor 16 does not receive the triggering signal from the sensing unit 14 (for example, does not receive the triggering signal from the sensing unit 14 for duration of 5 seconds). The processor 16 determines that the user still holds the handheld device 1 if the processor 16 still receives the triggering signal from the sensing unit 14 continually or intermittently.

The processor 16 executes the step S22 if the processor 16 determines that the user stops holding the handheld device 1; otherwise, the processor 16 executes the step S18 again.

S22: the processor 16 executes privacy preserving procedure to switch the handheld device 1 to privacy preserving status.

Preferably, the privacy preserving procedure may power off the handheld device 1 or turn off screen. If the privacy preserving procedure is to power off the handheld device 1, the processor 16 executes a powering off procedure to automatically power off the handheld device 1 when the processor 16 identifies, according to the sensing of the sensing unit 14, that the user stops holding the handheld device 1. If the privacy preserving procedure is to turn off the screen 12 of the handheld device 1, the processor 16 executes a screen turning-off procedure to automatically turn off the display screen 12 of handheld device 1 when the processor 16 identifies, according to the sensing of the sensing unit 14, that the user stops holding the handheld device 1.

Alternatively, the privacy preserving procedure may turn off the screen and then executes (or proceeds to execute) the second predetermined procedure. More particularly, when performing the privacy preserving procedure, the processor 16 first turns off the display screen 12 and locks the display screen if screen locked is set, and then executes the second predetermined procedure such as media playback procedure, a communication procedure, a download procedure, an upload procedure, or other procedures not requiring display.

Therefore, the user can directly switch the handheld device 1 to privacy preserving status and then automatically execute the second predetermined procedure by only stopping holding the handheld device 1 without needing other additional operation, thus gaining better user experience.

The present invention automatically executes privacy preserving procedure or a privacy non-preserving procedure by sensing the user holding the handheld device 1 or not. The present invention can provide effective privacy protection and simplify the operation of the handheld device 1.

Figure 3:
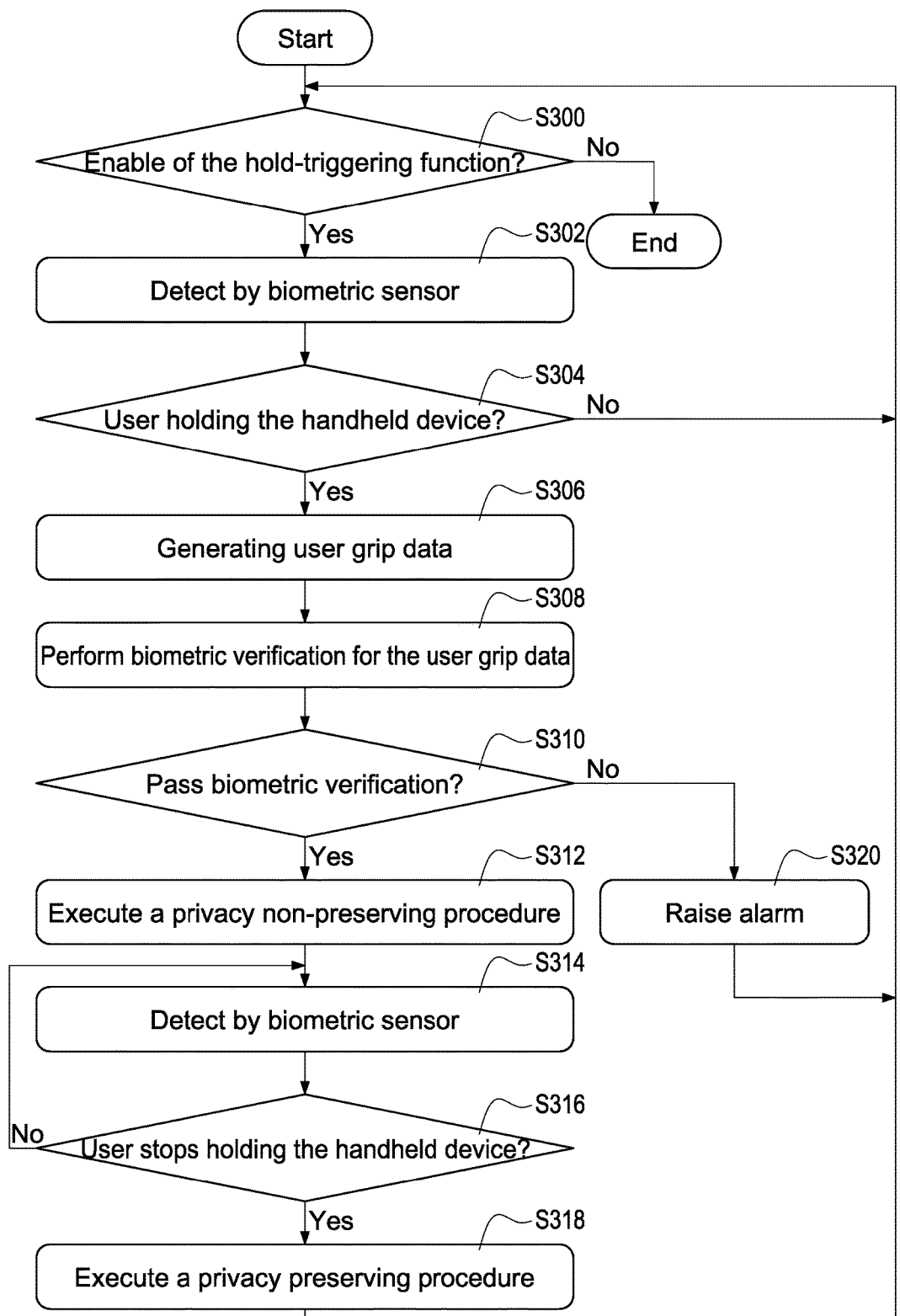
FIG. 3 shows a flowchart of the operating method for the handheld device 1 according to another embodiment of the present invention.

FIG. 3 shows a flowchart of the operating method for the handheld device 1 according to another embodiment of the present invention. In this embodiment, the handheld device 1 may comprises one or more sensing unit 14 and the sensing unit 14 is biometric sensor.

Preferably, the biometric sensor is a fingerprint sensor and at least one of the biometric sensors has a sensing region with area larger than 2.25 square centimeters, and at least one side of the sensing region has a side length larger than 1.5 centimeter. However, above-mentioned figures are not limitation of the present invention.

The operating method for the handheld device 1 according to the present invention has following steps to realize hold-triggering function by fingerprint identification.

Step S300: the processor 16 determines whether the hold-triggering function is enabled. The processor 16 executes step S302 if the hold-triggering function is enabled; otherwise the operating method for the handheld device 1 is ended.

Step S302: the processor 16 determines whether user currently holds the handheld device 1 according to the sensing of the biometric sensor. More particularly, the biometric sensor generates triggering signal and sends the triggering signal to the processor 16 when the biometric sensor senses the touch of user's finger (or palm) on the sensing region thereof.

Step S304: the processor 16 determines whether the user currently holds the handheld device 1. More particularly, the processor 16 determines that the user currently holds the handheld device 1 and then executes the step S306 when the processor 16 receives the triggering signal from the biometric sensor. The processor 16 determines that the user currently does not hold the handheld device 1 and then re-executes the step S300 when the processor 16 does not receive the triggering signal from the biometric sensor.

Step S306: the processor 16 generating a user grip data corresponding to the triggering signal from the biometric sensor, where the user grip data comprises a fingerprint composite data and the fingerprint composite data is corresponding to the fingerprint of finger (or palm print of palm) pressing on the sensing region.

Preferably, the processor 16 generates a plurality of fingerprint data (such as the fingerprints of thumb and index finger) according to the received triggering data, and then packets the plurality of fingerprint data to a fingerprint composite data (such as a fingerprint composite data for the fingerprints of thumb and index finger).

Preferably, the processor 16 may packet the complete fingerprint data to the fingerprint composite data. Alternatively, the processor 16 may first generate a plurality of fingerprint features by analyzing the plurality of fingerprint data and then packets the plurality of fingerprint features to the fingerprint composite data.

Step S308: the processor 16 performs biometric verification for the grip data. More particularly, the biometric verification is conducted by comparing the fingerprint composite data of the user grip data with a preset fingerprint composite data of the owner of the handheld device 1, which is set in advance.

Step S310: the processor 16 determines whether the user grip data passes the biometric verification. The processor 16 confirms the biometric verification for the user grip data if the fingerprint composite data of the user grip data is matched with the preset fingerprint composite data according to the determination of the processor 16. The processor 16 determines that the current user is the owner of the handheld device 1 and then executes step S312. The processor 16 confirms the biometric verification being failed for the user grip data if the fingerprint composite data of the grip data is not matched with the preset fingerprint composite data according to the determination of the processor 16. The processor 16 determines that the current user is not the owner of the handheld device 1 and then executes step S320.

Step S312: the processor 16 controls the handheld device 1 to execute a privacy non-preserving procedure to leave the privacy preserving status such that the handheld device 1 switches to the privacy non-preserving status.

The operating method for the handheld device 1 according to this embodiment can verify whether the current user is the actual owner of the handheld device 1 by fingerprint verification. Moreover, the handheld device 1 switches to the privacy non-preserving status only if the current user is the actual owner of the handheld device 1, thus preventing the privacy information of the handheld device 1 from peeping out or stealing by others.

Step S314: the processor 16 determines whether the user stops holding the handheld device 1 according to the sensing of the biometric sensor. More particularly, the biometric sensor stops generating the triggering signal and stops sending the triggering signal to the processor 16 when the user stops holding the handheld device 1 such that the user's finger or palm does not touch the sensing region of the biometric sensor.

Step S316: the processor 16 determines whether the user stops holding the handheld device 1. More particularly, the processor 16 determines that the user currently does not hold the handheld device 1 and then executes the step S318 when the processor 16 does not receive the triggering signal from the biometric sensor. The processor 16 determines that the user currently holds the handheld device 1 and then re-executes the step S314 when the processor 16 still receives the triggering signal from the biometric sensor.

Step S318: the processor 16 control the handheld device 1 to execute privacy preserving procedure to switch the handheld device 1 to the privacy preserving status from the privacy non-preserving status.

If the processor 16 determines that the fingerprint composite data of the user grip data is not matched with the preset fingerprint composite data in step S310, the processor 16 executes step S320: the processor 16 raises alarm through the display screen 12 or loudspeaker (not shown), or activates automatic communication procedure to send alarm to other pre-set electronic device.

Figure 4:
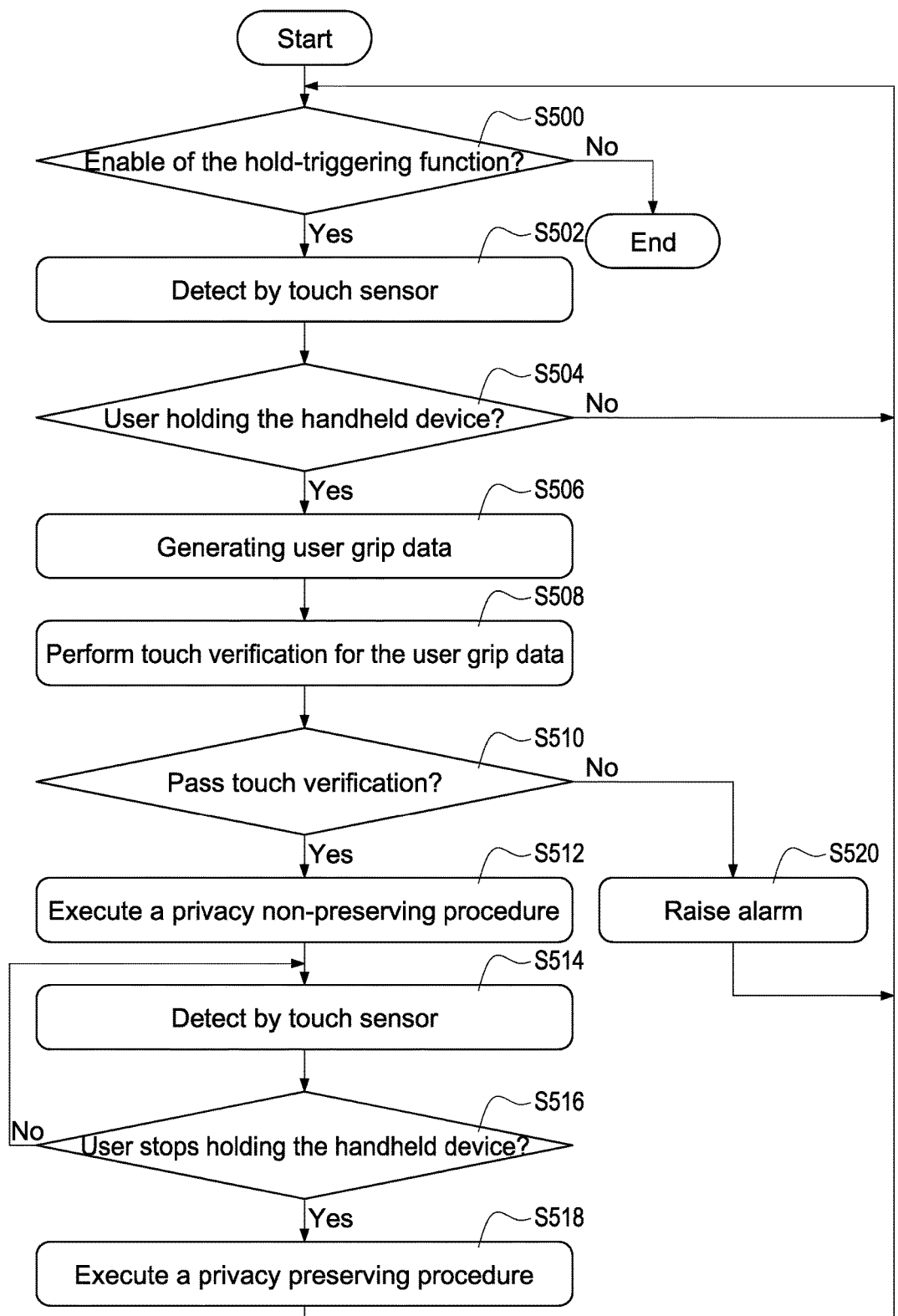
FIG. 4 shows a flowchart of the operating method for the handheld device 1 according to still another embodiment of the present invention.

FIG. 4 shows a flowchart of the operating method for the handheld device 1 according to still another embodiment of the present invention. In this embodiment, the handheld device 1 may comprise one or more sensing unit 14 and the sensing unit 14 is touch sensor. Preferably, the touch sensor is a force sensor and the sensing region of the touch sensor is arranged outside the display region of the display screen 12 of the handheld device 1.

The operating method for the handheld device 1 according to the present invention has following steps to realize hold-triggering function by touch identification.

Step S500: the processor 16 determines whether the hold-triggering function is enabled. The processor 16 executes step S502 if the hold-triggering function is enabled; otherwise the operating method for the handheld device 1 is ended.

Step S502: the processor 16 determines whether user currently holds the handheld device 1 according to the sensing of the touch sensor. More particularly, the touch sensor generates triggering signal and sends the triggering signal to the processor 16 when the touch sensor senses the touch or pressing of user's finger (or palm) on the sensing region thereof.

Step S504: the processor 16 determines whether the user currently holds the handheld device 1. More particularly, the processor 16 determines that the user currently holds the handheld device 1 and then executes the step S506 when the processor 16 receives the triggering signal from the touch sensor. The processor 16 determines that the user currently does not hold the handheld device 1 and then re-executes the step S500 when the processor 16 does not receive the triggering signal from the touch sensor.

Step S506: the processor 16 generating a user grip data corresponding to the triggering signals from the touch sensor, where the user grip data comprises a force composite data (or a touch composite data). The force composite data is corresponding to pressing forces of the user's fingers pressing on the sensing regions. The touch composite data is corresponding to change of pressing status of user's fingers pressing on the sensing regions (such as the number of the pressing fingers or the pressing order of the pressing fingers)

Preferably, the processor 16 generates a plurality of touch data and a plurality of force data according to the received triggering signals. For example, the processor 16 determines the number of pressing finger on the first touch sensor is one by the triggering signal from the first touch sensor, and determines the number of pressing fingers on the second touch sensor is two by the triggering signal from the second touch sensor. The processor 16 may determine the pressing force exerting on the first touch sensor is 50 g by the triggering signal from the first touch sensor and determine the pressing forces exerting on the second touch sensor are 30 g and 80 g, respectively, by the triggering signal from the second touch sensor. Therefore, the processor 16 packets the plurality of touch data into a touch composite data (such as pressing with three fingers) and packets the plurality of force data into a force composite data (such as pressing with forces of 50 g, 30 g and 80 g respectively).

Preferably, the processor 16 may packet the complete touch data into the touch composite data and packet the complete force data into the force composite data. Alternatively, the processor 16 may first generate a plurality of simplified touch data (such as numeric data) by analyzing the plurality of touch data, and generate a plurality of simplified force data (such as numeric data) by analyzing the plurality of force data, and then packets the plurality of simplified touch data to the touch composite data and packets the plurality of simplified force data to the force composite data.

Step S508: the processor 16 performs touch verification for the user grip data. More particularly, the touch verification may be conducted by comparing the touch composite data of the user grip data with a preset touch composite data of the owner of the handheld device 1, which is set in advance. Alternatively, the touch verification may be conducted by comparing the force composite data of the user grip data with a preset force composite data of the owner of the handheld device 1, which is set in advance.

Step S510: the processor 16 determines whether the user grip data passes the touch verification. The processor 16 confirms the touch verification for the user grip data if the force composite data (or the touch composite data) of the user grip data is matched with the preset force composite data (or the preset touch composite data) according to the determination of the processor 16. The processor 16 then determines that the current user is the owner of the handheld device 1 and then executes step S512. The processor 16 confirms the touch verification being failed for the user grip data if the comparison is not matched. The processor 16 then determines that the current user is not the owner of the handheld device 1 and then executes step S520.

Step S512: the processor 16 controls the handheld device 1 to execute a privacy non-preserving to leave the privacy preserving status such that the handheld device 1 switches to the privacy non-preserving status.

The operating method for the handheld device 1 according to this embodiment can verify whether the current user is the actual owner of the handheld device 1 by touch verification. Moreover, the handheld device 1 switches to the privacy non-preserving status only if the current user is the actual owner of the handheld device 1, thus preventing the privacy information of the handheld device 1 from peeping out or stealing by others.

Step S514: the processor 16 determines whether the user stops holding the handheld device 1 according to the sensing of the touch sensor. More particularly, the touch sensor stops generating the triggering signal and stops sending the triggering signal to the processor 16 when the user stops holding the handheld device 1 such that the user's finger or palm does not touch the sensing region of the touch sensor.

Step S516: the processor 16 determines whether the user stops holding the handheld device 1. More particularly, the processor 16 determines that the user currently does not hold the handheld device 1 and then executes the step S518 when the processor 16 does not receive the triggering signal from the touch sensor. The processor 16 determines that the user currently holds the handheld device 1 and then re-executes the step S514 when the processor 16 still receives the triggering signal from the touch sensor.

Step S518: the processor 16 control the handheld device 1 to execute privacy preserving procedure to switch the handheld device 1 to the privacy preserving status from the privacy non-preserving status.

If the processor 16 determines that the touch (force) composite data of the user grip data is not matched with the preset touch (force) composite data in step S510, the processor 16 executes step S520: the processor 16 raises alarm through the display screen 12 or loudspeaker (not shown), or activates automatic communication procedure to send alarm to other pre-set electronic device.

With reference to FIGS. 5 and 6, FIG. 5 shows a first operation of the handheld device 1 according to an embodiment of the present invention, and FIG. 6 shows a second operation of the handheld device 1 according to an embodiment of the present invention. Those figures exemplify an operation of the handheld device 1 according to the present invention.

As shown in FIGS. 5 and 6, in this embodiment the handheld device 1 comprises three sensing units 140, 142, 144. The sensing unit 140 is arranged on an upper-left side of the handheld device 1 when viewing toward the display screen 12 to sense the left thumb of user; the sensing unit 142 is arranged on a right side of the handheld device 1 when viewing toward the display screen 12 to sense the other four fingers of user's left hand; the sensing unit 144 is arranged on a back side of the handheld device 1 when viewing toward the display screen 12 to sense the palm of user.

In this embodiment the operating method of the present invention further provides a gesture-triggering function. More particularly, the gesture-triggering function can automatically switch the handheld device 1 to privacy non-preserving status and then execute different procedures by sensing the different gestures of user.

The following description exemplifies the sensing units 140, 142, 144 as fingerprint sensors. When the handheld device 1 is in privacy preserving status and the five fingers and palm of user hand closely touch the handheld device 1 as shown in FIG. 5, the handheld device 1 automatically switches to privacy non-preserving status and then executes a first procedure (such as webpage browser procedure). When the handheld device 1 is in privacy preserving status and only the thumb and index finger of user hand closely touch the handheld device 1 as shown in FIG. 6, the handheld device 1 automatically switches to privacy non-preserving status and then executes a second procedure (such as social software procedure).

Moreover, the fingerprint sensor can identify different fingers of the same user. The gesture-triggering function can be set by user to execute following procedures: automatically executing a third procedure (such as instant communication procedure) when detecting user's thumb and middle finger closely touching the handheld device 1; automatically executing a fourth procedure (such as mail sending/receiving procedure) when detecting user's thumb and ring finger closely touching the handheld device 1; automatically executing a fifth procedure (such as photo taking procedure) when detecting user's thumb and little finger closely touching the handheld device 1.

The following description exemplifies the sensing units 140, 142, 144 as force sensors. When the handheld device 1 is in privacy preserving status and the five fingers and palm of user hand closely touch the handheld device 1 as shown in FIG. 5, the handheld device 1 automatically switches to privacy non-preserving status and then executes a first procedure (such as webpage browser procedure). When the handheld device 1 is in privacy preserving status and only the thumb and index finger of user hand closely touch the handheld device 1 as shown in FIG. 6, the handheld device 1 automatically switches to privacy non-preserving status and then executes a second procedure (such as social software procedure).

Moreover, the force sensor can identify different exerting force of the same finger. The gesture-triggering function can be set by user to execute following procedures:

automatically executing a third procedure (such as instant communication procedure) when detecting user's thumb and index finger lightly pressing the handheld device 1; automatically executing a fourth procedure (such as mail sending/receiving procedure) when detecting user's thumb and index finger heavily pressing the handheld device 1; automatically executing a fifth procedure (such as photo taking procedure) when detecting user's five fingers lightly pressing the handheld device 1 at the same time.

By above-mentioned gesture-triggering function, the operation of the handheld device can be simplified and user experience is better.

Thus, particular embodiments have been described. Other embodiments are within the scope of the following claims. For example, the actions recited in the claims may be performed in a different order and still achieve desirable results.

What is claimed is:

1. An operating method for a handheld device, comprising:
   a) detecting whether a user currently holds the handheld device by using at least one fingerprint sensor arranged on a grip portion of the handheld device;
   b) generating a triggering signal corresponding to a plurality fingers of the user pressing on the at least one fingerprint sensor when each time the fingers of the user are detected to press on the at least one fingerprint sensor;
   c) generating a plurality of fingerprint data according to the triggering signal and generating user grip data corresponding to the plurality of fingerprint data, wherein the user grip data includes fingerprint composite data corresponding to a combination of the fingers pressing on the at least one fingerprint sensor;
   d) determining that the user grip data passes a fingerprint verification when the fingerprint composite data matches with any of a plurality of preset fingerprint composite data, controlling the handheld device to execute a privacy non-preserving procedure including turning on a display screen and unlocking a screen lock, determining at least one of a plurality of first predetermined procedures requiring display according to the matched preset fingerprint composite data corresponding to the combination of the fingers pressing on the at least one fingerprint sensor executing or proceeding to execute the at least one determined first predetermined procedure to display information by the display screen being turned on, and stopping executing or temporarily stopping executing a second predetermined procedure not requiring display for releasing processing resources of the handheld device, wherein the first predetermined procedures respectively correspond to the plurality of preset fingerprint composite data respectively corresponding to the different combinations of the fingers;
   e) continually or intermittently detecting whether the user stops holding the handheld device by the at least one fingerprint sensor; and
   f) determining the user stops holding the handheld device when the triggering signal is not received and controlling the handheld device to execute a privacy-preserving procedure, including turning off the display screen, locking the screen lock, stopping executing or temporarily stopping executing the at least one first predetermined procedure for releasing processing resources of the handheld device, and executing or proceeding to execute the second predetermined procedure to process information under a status of the display screen being turned off.

2. The operating method in claim 1, wherein a sensing region of one of the at least one fingerprint sensor has an area larger than 2.25 square centimeters and a side length larger than 1.5 centimeters; wherein the step a) is performed to determine that the user holds the handheld device when the fingers or a palm of the user is detected to press on the at least one fingerprint sensor; wherein the step c) is performed to generate the fingerprint composite data corresponding to fingerprints of the fingers pressing on the at least one fingerprint sensor or palm print of the palm pressing on the at least one fingerprint sensor.

3. The operating method in claim 1, wherein the first predetermined procedures comprise instant communication procedure, social software procedure, or webpage browser procedure.

4. The operating method in claim 1, wherein the second predetermined procedures comprise media playback procedure, communication procedure for backing-up or synchronizing data, a download procedure, or an upload procedure.

5. An operating method for a handheld device, comprising:
   a) detecting whether a user currently holds the handheld device by using a plurality of touch sensors arranged on a grip portion of the handheld device;
   b) when each time any finger of the user is detected to touch or press on any of the touch sensors, generating a triggering signal corresponding to holding action
   c) determining that the user holds the handheld device when receiving the triggering signals from more than half of the touch sensors, generating a plurality of touch data corresponding to the triggering signals, and generating user grip data corresponding to the triggering signal corresponding to the plurality of touch data, wherein the user grip data includes touch composite data corresponding to a touching status variation exerted on the touch sensors;
   d) controlling the handheld device to execute a privacy non-preserving procedure including turning on a display screen and unlocking a screen lock when the touch composite data matches with any of a plurality preset touch composite data, determining at least one of a plurality of first predetermined procedures requiring display according to the matched preset touch composite data corresponding to the touching status variation exerted on the touch sensors, executing or proceeding to execute the at least one first predetermined procedure to display information by the display screen being turned on, and stopping executing or temporarily stopping executing a second predetermined procedure not requiring display for releasing processing resources of the handheld device, wherein the first predetermined procedures respectively correspond to the plurality of preset touch composite data respectively corresponding to the different touching status variations;

e) continually or intermittently detecting whether the user stops holding the handheld device by using the touch sensors; and f) determining the user stops holding the handheld device when the triggering signal is not received and controlling the handheld device to execute a privacy-preserving procedure, including turning off the display screen, locking the screen lock, stopping executing or temporarily stopping executing the at least one first predetermined procedure for releasing processing resources of the handheld device, and executing or proceeding to execute the second predetermined procedure to process information under a status of the display screen being turned off.

6. The operating method in claim 5, wherein the step a) is performed to determine whether the user holds the handheld device by touch sensors arranged outside a display region of a display screen of the handheld device.

7. The operating method in claim 6, wherein the touch sensors are force sensors and the step b) comprises following steps:

b1) generating a user grip data corresponding to the triggering signal when detecting that the user holds the handheld device, wherein the user grip data further comprises a force composite data corresponding to forces exerted on the touch sensors by user fingers; and b2) controlling the handheld device to execute the privacy non-preserving procedure when the force composite data matches with preset force composite data.

8. The operating method in claim 6, wherein the touch sensors are force sensors;

the user grip data further comprises force composite data, the force composite data corresponding to force variations exerted on the touch sensors by the fingers of the user;

the step d) is performed to control the handheld device to execute the privacy non-preserving procedure when the touch composite data matches with any of the plurality preset touch composite data and the force composite data matches with preset force composite data corresponding to the matched preset touch composite data, determining the at least one first predetermined procedure according to the matched preset touch composite data and the matched force composite data, and executing or proceeding to execute the at least one first predetermined procedure, and stopping executing or temporarily stopping executing the second predetermined procedure for releasing processing resources of the handheld device, wherein the first predetermined procedures respectively correspond to a plurality of different combinations of the plurality of preset touch composite data and the plurality of preset force composite data.

9. The operating method in claim 8, wherein the at least one first predetermined procedure is an instant communication procedure, a social software procedure, or a webpage browser procedure.

10. The operating method in claim 5, wherein the at least one first predetermined procedure is an instant communication procedure, a social software procedure, or a webpage browser procedure.

11. The operating method in claim 5, wherein the second predetermined procedure is a media playback procedure, a communication procedure for backing-up or synchronizing data, a download procedure, or an upload procedure.

* * * * *